United States Patent [19]
Cohen

[11] Patent Number: 5,465,201
[45] Date of Patent: Nov. 7, 1995

[54] OVERLOAD PROTECTION OF SWITCH MODE CONVERTERS

[75] Inventor: Isaac Cohen, Dix Hills, N.Y.

[73] Assignee: Lambda Electronics, Inc., Melville, N.Y.

[21] Appl. No.: 266,169

[22] Filed: Jun. 27, 1994

Related U.S. Application Data

[63] Continuation of Ser. No. 7,070, Jan. 21, 1993, abandoned.

[51] Int. Cl.[6] .............................. H02M 3/335; H02H 7/12
[52] U.S. Cl. ..................... 363/21; 363/56; 363/97; 323/284
[58] Field of Search ........................... 323/234, 282, 323/284, 285; 363/78.56, 21.97; 324/127, 128, 126

[56] References Cited

U.S. PATENT DOCUMENTS

| | | | |
|---|---|---|---|
| 3,768,012 | 10/1973 | Wilkinson | 324/127 |
| 4,605,997 | 8/1986 | Kirk | 363/16 |
| 4,629,971 | 12/1986 | Kirk | 323/289 |
| 4,642,748 | 2/1987 | Kirk | 363/56 |
| 4,709,316 | 11/1987 | Ngo et al. | 363/21 |
| 4,811,184 | 3/1989 | Koninsky et al. | 363/17 |
| 4,885,674 | 12/1989 | Varga et al. | 363/21 |
| 4,899,269 | 2/1990 | Rouzies | 363/41 |
| 4,928,200 | 5/1990 | Redl et al. | 361/93 |
| 4,975,820 | 12/1990 | Szepesi | 363/21 |
| 4,985,821 | 1/1991 | Cohen | 363/95 |
| 5,029,269 | 7/1991 | Elliott et al. | 363/21 |

Primary Examiner—Kristine L. Kincaid
Assistant Examiner—Adolf Berhane
Attorney, Agent, or Firm—Morgan & Finnegan

[57] ABSTRACT

A switch mode power converter having an overload protection system is disclosed. The system includes an input stage having an input voltage source. A switching circuit for coupling said input source to an output stage is provided. The output stage further includes a first filter circuit providing an output current to a load circuit. A second filter circuit is coupled to the output stage providing a voltage proportional to the output current and to internal temperature of the switch mode converter. An error amplifier responsive to the voltage derived by a second filter and a reference voltage, generates an error signal proportional to the difference of the voltage applied to the error amplifier. The error signal adjusts the operating parameters of the switching circuit.

29 Claims, 4 Drawing Sheets

OVERLOAD PROTECTION OF SWITCH MODE CONVERTERS

This is a continuation of application Ser. No. 07/007,070, filed on Jan. 21, 1993, now abandoned.

BACKGROUND OF THE INVENTION

The present invention relates to switch mode power converters and, in particular, to the protection of such converters against overload and short circuit conditions.

The conventional method of protecting switch mode power converters against overload or short circuit conditions is to turn OFF the power switch of the converter when the power switch current exceeds a predetermined value. In theory, this approach limits the output current to a safe value for the converter. Furthermore, the control method based on sensing the power switch current provides a substantially fast response time.

However, due to practical constraints, sensing the power switch current alone may not be sufficient for overload protection. Assuming ideal conditions, the above described method will limit the peak current in the power switch to a constant value. Depending upon the converter's topology and component values, the ratio of the output current of the converter to the peak current of the power switch can increase significantly as short circuit condition approaches in the output circuit. Consequently, an output current runaway may result. Furthermore, the power switch cannot be turned OFF instantly when its current exceeds the predetermined threshold. The turn OFF delay will allow a current overshoot, exacerbating the output current runaway.

Prior methods for solving the problems described above are either very complex or have relatively poor performance. For example, one method described previously is the use of a shunt resistance in the output circuit for sensing output current. Although, providing a shunt resistance is relatively simple, it causes undesired power dissipation. Another method for overload protection is described in U.S. Pat. No. 3,768,012 issued to Wilkinson and is illustrated again in FIG. 1. As described in more detail hereafter, the method illustrated in FIG. 1 may not provide accurate current measurements and requires additional undesirable windings.

Hence, there is a need for an improved circuit that can exhibit substantially ideal current characteristics.

OBJECTS OF THE INVENTION

It is, therefore, an object of the present invention to provide a simple circuit that can provide effective overload protection.

It is another object of the present invention to provide overload or short circuit protection without experiencing output current runaway conditions.

It is still another object of the present invention to provide an effective and efficient circuit for distributing the current of a common load among plurality of power converters.

It is still a further object of the present invention to provide a circuit for distributing the current in a common load among a plurality of power converters, such circuit further providing stress equalization at the output of the power converters instead of current equalization.

SUMMARY OF THE INVENTION

According to the present invention, the foregoing and other objects are attained by providing a switch mode power converter with an overload protection system. The converter includes an input stage responsive to an input voltage source. A switching circuit couples the input voltage source to the output stage of the power converter. The output stage includes a first filter circuit for smoothing the output current provided to the load. A second filter circuit is coupled across the inductor of the first filter circuit providing a voltage proportion to the output current and to the internal temperature of the power converter. An error amplifier responds to the voltage derived from the second filter and the voltage provided by a reference voltage source. The error amplifier generates an error signal which is proportional to the difference between the voltage signals to which the error amplifier is responsive. The error signal adjusts an operating parameter of the switching circuit.

According to another aspect of the invention, a plurality of switch mode power converters with overload protection system described above are connected in parallel to share the same load such that each power converter provides a current to the load. The reference voltage mentioned before is arranged to be proportional to the average current at the output of all the switch mode power converters connected in parallel.

The present invention relies on the fact that most switch mode converters are capable of sustaining significant output over-currents for short periods of time.

According to another aspect of the present invention, a conventional current limiting circuit may be utilized to control the power switch peak current to a value that is acceptable for short periods of time. Furthermore, a relatively slow reacting circuit according to the present invention may be employed to sense the actual output current, by measuring a DC voltage which is developed across the output inductors to control the steady state value of the output current.

The DC voltage developed across the output inductor is proportional to the output current. Furthermore, as the temperature of the output inductors rises, its inherent resistance rises also. The rise in inherent resistance of the output inductor leads to a further change of the DC voltage developed across the output inductor which is proportional to the output current. Thus, according to an embodiment of the present invention, the DC voltage developed across the output inductor is compared with a reference voltage to provide an error signal which can modulate either the frequency of operation of the converter or its duty cycle or both.

DETAILED DESCRIPTION OF THE DRAWINGS

Figure 1:
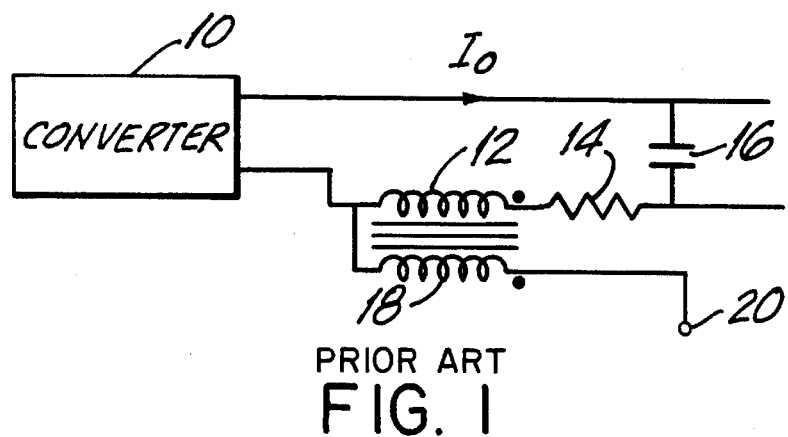
FIG. 1 illustrates a prior art circuit for sensing output current by utilizing an AC cancellation circuit.

FIG. 1 illustrates a conventional prior art circuit for sensing output current by utilizing an AC voltage cancellation circuit. A buck-derived converter 10 is coupled to a low pass filter which includes an inductor 12 and a capacitor 16 connected in series. Resistor 14 represents the internal resistance R of inductor 12. Inductor 18 is connected to one terminal of inductor 12 and has the same number of winding turns as inductor 12. However, the winding of inductor 18 is in opposite direction to the winding of inductor 12 so that the voltage induced by inductor 12 can be canceled by voltage generated in inductor 18.

In order to measure the output current $I_0$ provided by converter 10, it is possible to sense the voltage provided at point 20. Inductor 12 carries a current with an AC and a DC component. Since inductor 18 cancels the AC component, the voltage at point 20, at least theoretically is a DC voltage proportional to the output current $I_0$ and resistance 14, such that $$V_{20} = -R \cdot I_0$$

As mentioned before, the current sensing technique illustrated in FIG. 1 requires an additional winding 18 and may not provide accurate information since the cancellation of the AC component may be imperfect due to leakage AC fields.

Figure 2:
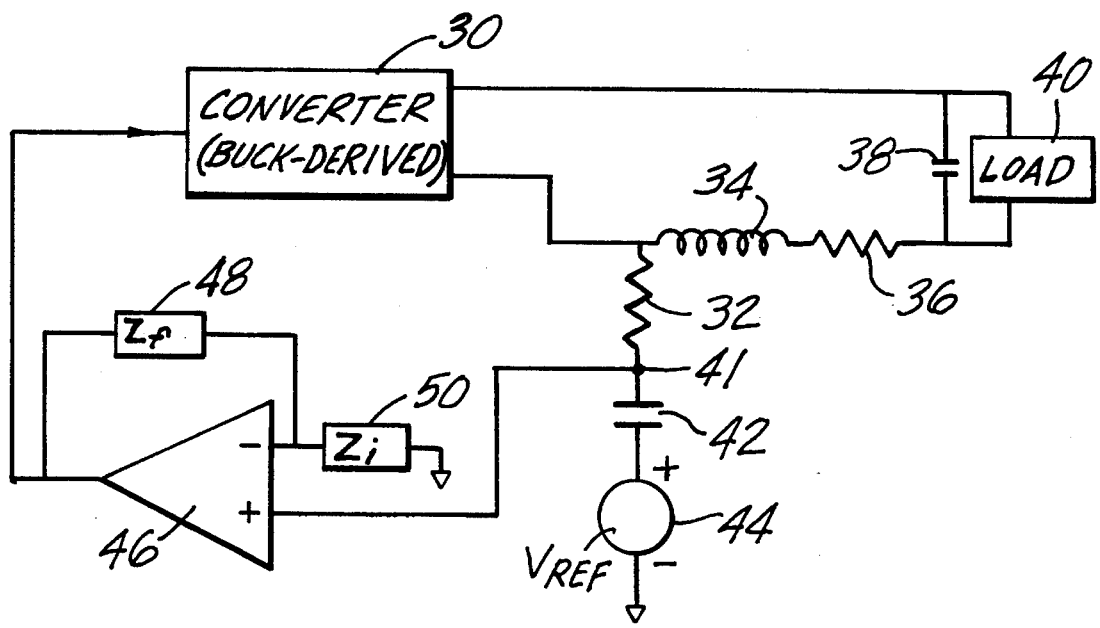
FIG. 2 illustrates circuit diagram of one embodiment of the invention for buck-derived converters.

FIG. 2 illustrates a circuit diagram of one embodiment of the present invention for buck-derived converters. Accordingly, a buck-derived converter 30 is coupled to an output filter which includes inductor 34 coupled in series with capacitor 38. Inductor 34 also includes an inherent resistance which is illustrated as a resistor 36 in series with inductor 34. A load 40 is coupled in parallel with capacitor 38.

A filter circuit, including resistor 32 and capacitor 42, is connected to an output terminal of converter 30 and to one terminal of inductor 34. A reference voltage source 44 is coupled in series with capacitor 42. The common terminal between resistor 32 and capacitor 42 is coupled to the non-inverting input of an amplifier 46. An impedance network, including impedance 48 and 50, is coupled to the inverting input of amplifier 46 for providing an amplification ratio.

The output of amplifier 46 is coupled to converter 30 for further control of the switching transistor of the converter.

Thus, the AC component of output current at the output stage of the converter is filtered by a low pass filter, including resistor 32 and capacitor 42. Consequently, the voltage at point 41 is proportional to the output current of converter 30. As it can be appreciated by those skilled in the art, the filtration of the AC component results in a signal that lags the actual output current. In many applications, this lag may be overlooked.

Once the voltage at node 41 becomes substantially equal or more than the reference voltage $V_{ref}$, a signal is generated at the output of amplifier 46. The generated signal at the output of amplifier 46 can modulate either the frequency of operation of converter 30 or its duty cycle or both. As a result, the output current can be kept at a substantially constant value.

Figure 3:
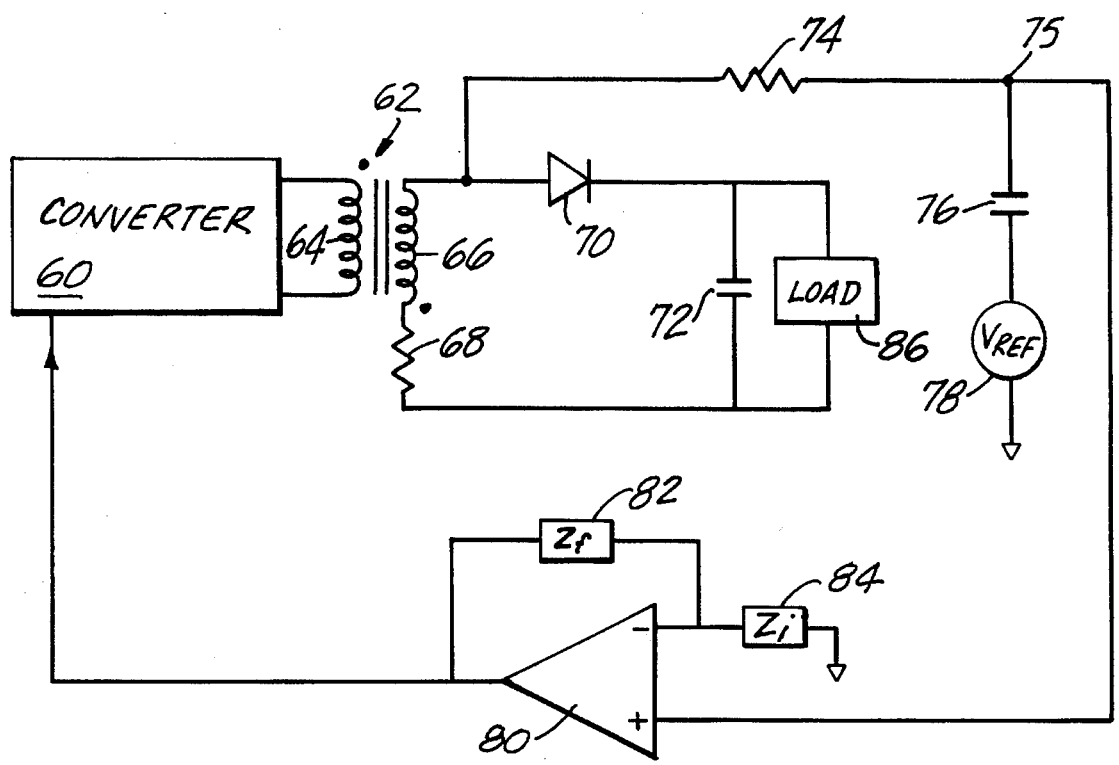
FIG. 3 illustrates circuit diagram of another embodiment of the invention for buck-boost derived converters.

FIG. 3 illustrates another embodiment according to the present invention, for isolated buck-boost converters. Accordingly, the input section of converter 60 is coupled to the primary winding 64 of flyback transformer 62. The secondary winding 66 of flyback transformer 62 has an inductance L and an inherent resistance R illustrated as resistor 68. A diode 70 is coupled in series to secondary winding 66. Capacitor 72 is further coupled in series with diode 70 and secondary winding 66. A load 86 is connected in parallel with capacitor 72.

A filter circuit including resistor 74 and capacitor 76 is connected to one terminal of secondary winding 66. A reference voltage source 78 is coupled in series with capacitor 76. The common terminal between resistor 74 and capacitor 76 is coupled to a non-inverting input of an amplifier 80. An impedance network, including impedance 82 and 84, is coupled to the inverting input of amplifier 80 for providing an amplification ratio.

The output of amplifier 80 is coupled to the input section of converter 60 for further control of the switching transistor of the converter.

The principle of operation of the overload protection circuit of FIG. 3 is similar to that described in conjunction with FIG. 2. Thus, the AC voltage appearing across the secondary winding 66 is attenuated by the low pass filter consisting of resistor 74 and capacitor 76. The voltage at point 75 has a value proportional to the output current of the converter. Once the voltage at node 75 becomes substantially equal or more than the reference voltage 78, a signal is generated at the output of amplifier 80. The generated signal at the output of amplifier 46 can modulate either the switching frequency of the converter or the duty cycle or both. As a result, the output current can be kept at a substantially constant value.

As will be appreciated by those skilled in the art, a peak current limiting circuit for sensing converter switch current may be employed according to the present invention for overload protection during the time necessary for the circuit of FIGS. 2 and 3 to react.

Figure 4:
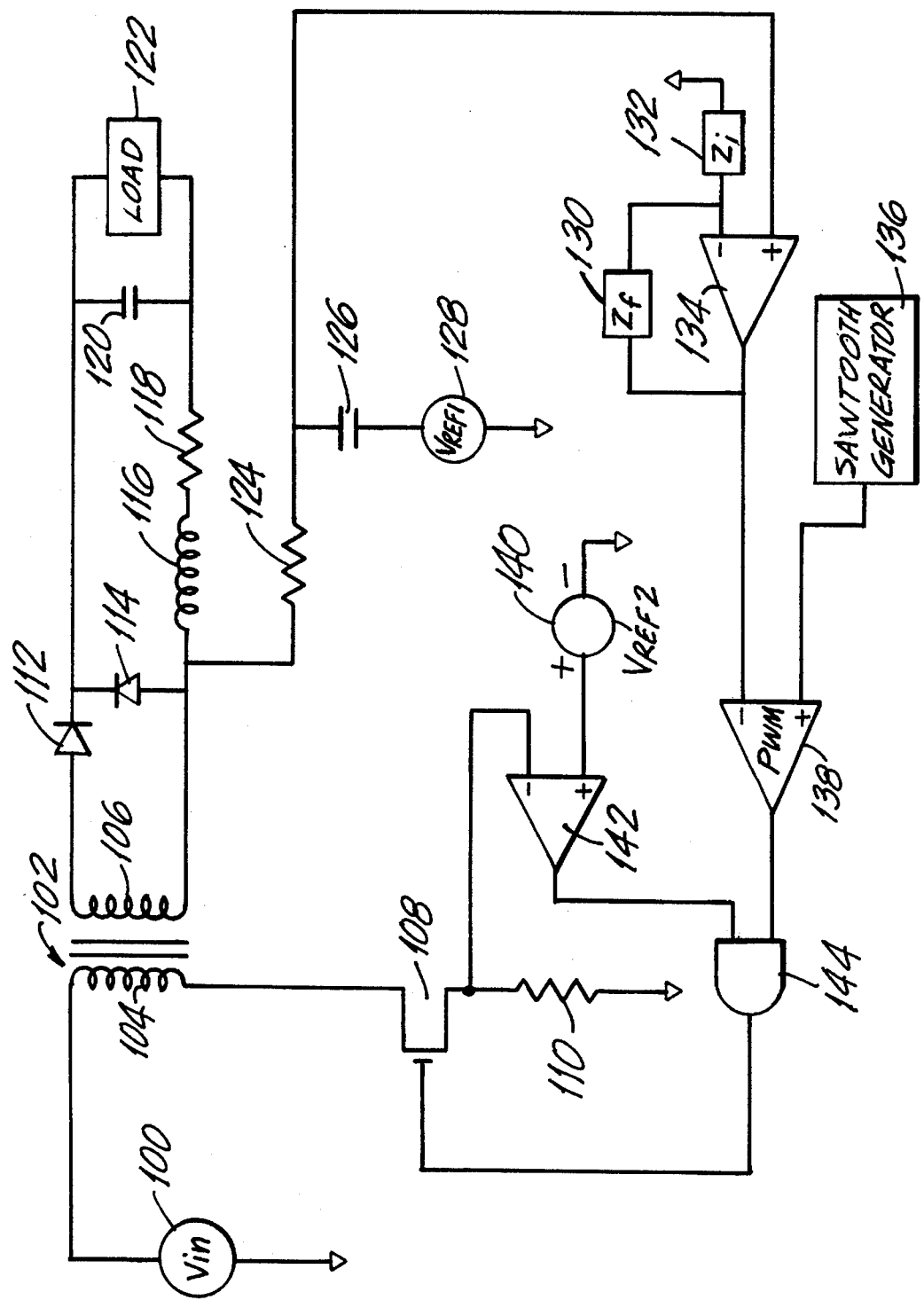
FIG. 4 illustrates circuit diagram according to the present invention utilizing both input and output current sensing.

FIG. 4 illustrates another embodiment of the present invention, having both input and output current sensing. An input voltage Vin is provided by input voltage source 100 to the primary winding 104 of transformer 102. The primary winding 104 is coupled in series to a switching transistor 108. The current provided in the switching transistor can be sensed by resistor 110 which is connected in series with transistor 108.

The voltage across resistor 110 is coupled to the inverting input of amplifier 142. The non-inverting input of amplifier 142 is coupled to a reference voltage source 140. The output of amplifier 142 is coupled to a terminal of an AND gate 144.

The secondary winding 106 of transformer 102 is coupled to a diode 112 at one terminal and a diode 114 at its other terminal. A first filter circuit including inductor 116 in series with capacitor 120 is coupled to the terminal of diode 114 and secondary winding 106. The common terminal of diodes 112 and 114 is coupled to the other end of the first filter circuit. The ohmic resistance of inductor 116 is illustrated as resistance 118 in series with inductor 116. A load 112 is coupled in parallel with capacitor 120.

A second filter circuit including resistor 124 and capacitor 126 is connected to a terminal of secondary winding 106, and to one terminal of inductor 116. A reference voltage source 128 is coupled in series with capacitor 126. The common terminal between resistor 124 and capacitor 126 is coupled to the non-inverting input of an amplifier 134. An impedance network including impedance 130 and 132 is coupled to the inverting input of amplifier 134 for providing an amplification ratio.

The output of amplifier 134 is coupled to an inverting input of comparator 138. The non-inverting input of comparator 138 receives a saw-tooth signal from saw-tooth generator 136. Thus, the output of comparator 138 provides a pulse width modulated voltage. The output of comparator 138 is coupled to the other terminal of AND gate 144. The output of the AND gate is coupled to the input of transistor 108.

Accordingly, transistor 108 switches OFF whenever the input current exceeds a predetermined value, or when the output current according to the present invention exceeds a predetermined value. Consequently, the circuit illustrated in FIG. 4 can provide peak current limiting for overload protection during the time necessary for the output current sensing circuit to react.

Figure 5:
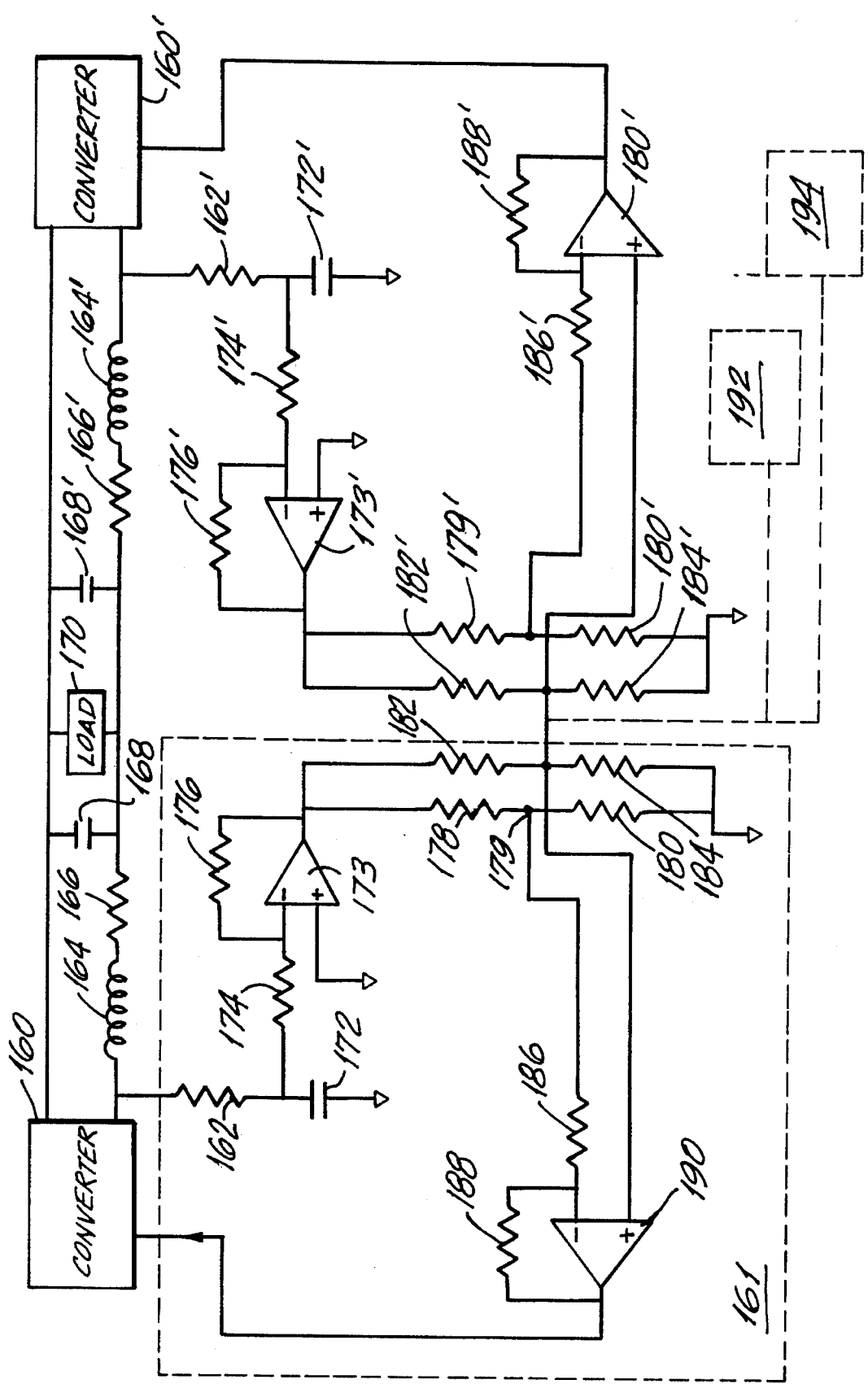
FIG. 5 illustrates circuit diagram of still another embodiment of the invention for sharing of switch mode power converters.

FIG. 5 illustrates another embodiment of the present invention which is suitable for sharing power supplied in parallel to a load by a plurality of switch mode power converters. Thus, load 170 of FIG. 5 may share two or more converters 160, 160', etc.

Converters 160 and 160' may be similar. Thus the circuit 161 for sensing current at the output stage is described for one converter. It will be appreciated by those skilled in the art that a plurality of converters or power supplies may be connected having circuits 192 and 194 similar to circuit 161 for sensing current at the output stage according to the present invention to provide an accurate sharing of the power supplies.

Accordingly, a converter 160 is coupled to a first filter circuit which includes an inductor 164 and a capacitor 168 connected in series. Resistor 166 denotes the internal resistance of inductor 164. Load 170 is coupled in parallel with capacitor 168.

A second filter circuit, including resistor 162 and capacitor 172, is connected to an output terminal of converter 160 and to one terminal of inductor 164. One terminal of capacitor 172 is coupled to resistor 162 and the other terminal of capacitor 172 is coupled to the reference ground of the circuit. The voltage across capacitor 172 is coupled to the inverting input of an amplifier 173 via resistor network 174 and 176. The non-inverting input of amplifier 173 is coupled to the reference ground. Resistors 174 and 176 provide the amplification ratio.

The output of amplifier 173 is coupled to a balancing network which has four resistors 178, 180, 182 and 184, each resistor having the same value R. Resistor pairs 178, 180 and 182, 194 are respectively connected in parallel. The common terminal 179 of resistors 178 and 180 is coupled to the inverting terminal of an amplifier 190 via a resistor network 186 and 188. Similarly, the common terminal 183 of resistors 182 and 184 is coupled to the non-inverting input of amplifier 190. The output of amplifier 190 is coupled to converter 160 for further control of switching transistor of the converter. The common terminal 183 is connected to the common terminal 183'.

It will be appreciated by those skilled in the art that a plurality of power supplies having current sensing circuit 192, 194 . . . may be coupled to load 170, as illustrated in FIG. 5.

Thus, the AC component of output current at the output stage of each converter is filtered by a low pass filter, including resistor 162 and capacitor 172. Consequently, the voltage across capacitor 172 is proportional to the output current of the converter. Thus, the output voltage of amplifier 173 is proportional to output current of converter 160. Similarly, the output voltage of amplifier 173' is proportional to output current of converter 160'.

The voltage across resistors 184 and 184' is proportional to the average value of currents at output stages of converters 160, 160', . . . which are connected in parallel.

The current at the output stage of each converter is compared to the average value of currents at the output stage of all converters connected in parallel. The difference between the current at the output stage of each converter and the average current provides a signal at the output of each amplifier 190, 190', which can modulate either the frequency of operation of each converter or its duty cycle. As a result, the output current of each converter can be adjusted to be equal to the average value of currents at the output stage of all converters connected in parallel. If the cooling of one of the converters is deficient, the temperature of its inductor will increase causing an increase of its winding resistance. Since the circuit of the present invention forces an equal DC voltage drop across the inductors, the current of the hotter converter will decrease, so the load distribution among converters will tend to reduce the difference in the stresses imposed on the converters rather than equalize the currents as suggested by prior art.

Thus the method and system, according to the present invention, advantageously permit extremely accurate and efficient overload protection and parallel sharing of power converters. Remarkably, the invention as described is capable of providing such overload protection and load sharing of power converters by using a voltage drop already existent across an ever present filter inductor thereby eliminating the need for shunts or other current sensing devices.

Other advantages of the circuit, according to the present invention, includes lower manufacturing cost and, most importantly, lower power dissipation.

The invention in its broader aspects, therefore, is not limited to the specific embodiment herein shown and described but departure may be made therefrom within the scope of the accompanying claims without departing from the principles of the invention and without sacrificing its chief advantages.

I claim:

1. A switch mode power converter having an overload protection system, said converter comprising:

an input stage having an input voltage source;

a switching circuit for coupling said input voltage source and an output stage;

said output stage further comprising an inductor for providing an output current to a load circuit, said inductor having a first terminal and a second terminal, said inductor having an inherent resistance, said output current thereby providing a voltage between the first terminal and the second terminal of said inductor including a DC voltage component proportional to said inherent resistance and to said output current;

a filter circuit having a pole and having a filter input and a filter output, said filter input coupled to said inductor to sense said voltage between the first terminal and the second terminal, said filter circuit providing said DC voltage component at said filter output, said DC voltage thereby being proportional to internal temperature of said converter;

an error amplifier responsive to said DC voltage and to a reference voltage source said error amplifier providing an error signal proportional to the difference between said DC voltage proportional to said output current and said reference voltage, said error signal adjusting an operating parameter of said switching circuit.

2. The switch mode power converter according to claim 1 wherein said error signal causes a duty cycle parameter of said switching circuit vary.

3. The invention according to claim 2, wherein said switching circuit is a transistor.

4. The invention according to claim 3 wherein said output stage further comprises a capacitance coupled in series with said inductor.

5. The invention according to claim 4, wherein said load is coupled in parallel with said capacitance.

6. The invention according to claim 5 wherein said filter further comprises a resistance coupled in series with a capacitance forming a common terminal wherein said common terminal provides said voltage proportional to said output current and internal temperature of said converter.

7. The invention according to claim 6 wherein said reference voltage source is coupled in series to said capacitance of said filter.

8. The invention according to claim 7 wherein said error signal is coupled to a pulse width modulator, the output of said pulse width modulator controlling said switching transistor.

9. The invention according to claim 8 wherein the current of said switching transistor is compared with a reference signal to provide an input current error signal.

10. The invention according to claim 9 wherein said input current error signal and said output of said pulse width modulator are coupled to an AND gate, the output of said AND gate providing a control signal, for controlling the switching of said transistor.

11. The invention according to claim 10, wherein said converter is a buck-derived converter.

12. The invention according to claim 10, wherein said converter is an isolated buck-boost derived converter.

13. In a switch mode power converter circuit having an input stage, including a voltage source and a switching transistor, and an output stage having an inductor for providing an output current to a load, said inductor having a first terminal and a second terminal, said inductor having an internal resistance, said switch mode power convertor having an output current sensing circuit wherein said output current sensing circuit comprises:

a filter circuit connected to said inductor for obtaining the DC voltage component of the voltage between said first terminal and said second terminal generated across the internal resistance of said inductor, said filter circuit having a resistance coupled to a capacitance, said resistance and said capacitance forming a common terminal, wherein said common terminal provides said DC voltage proportional, to said output current and internal temperature of said power convertor, and wherein other terminal of said resistance coupled to a capacitance is connected to said inductor to sense said voltage generated between said first terminal and said second terminal across the internal resistance;

an error amplifier responsive to said DC voltage proportional to said output current, said error amplifier further responsive to a reference voltage, the output of said error amplifier providing an error signal for controlling the switching of said switching transistor.

14. The invention according to claim 13, wherein said voltage proportional to said output current and internal temperature of said power converter is coupled to filter amplifier and said error amplifier is responsive to said filter amplifier.

15. The invention according to claim 14 wherein a plurality of said switch mode power converters are connected in parallel to share said load such that each power converter provides a current to said load, and said reference voltage is proportional to the average current at the output of said plurality of switch mode power converters.

16. The invention according to claim 15 wherein said reference voltage for each power converter is provided by coupling two resistors in series to the output of said filter amplifier, wherein all the common terminals of said two resistors at each switch mode power converter are connected together.

17. The invention according to claim 16 wherein the output of said filter amplifier is further coupled to two resistors connected in series, wherein the common terminal of said two resistors in series is coupled to the input of said error amplifier.

18. A method for providing overload protection in a switch mode power convertor comprising the steps of:

providing an input voltage source to an input stage of said switch mode power convertor;

providing a switching circuit for coupling said input voltage source to an output stage;

providing filtered output current to a load circuit by an inductor, said inductor having a first terminal and a second terminal, said inductor having an inherent resistance, said output current thereby providing a voltage between the first terminal of said inductor including a DC voltage component proportional to said inherent resistance and to said output current;

providing a filter circuit having a pole and having a filter input and a filter output said filter input coupled to said inductor to sense said voltage between the first terminal and the second terminal, said filter circuit generating said DC voltage component at said filter output, said DC voltage component thereby proportional to internal temperature of said power convertor;

providing an error signal proportional to the difference between said DC voltage component and a reference voltage, said error signal modulating the frequency of operation of said switching circuit.

19. The method according to claim 18 further comprising the step of varying the duty cycle of said switching circuit by said error signal.

20. The method according to claim 19 wherein said step of providing filtering by a first filter further comprises the step of providing an inductance coupled in series with a capacitance.

21. The method according to claim 20 wherein said step of providing a second filter circuit further comprises the step of providing a resistance coupled in series with a capacitance forming a common terminal wherein said common terminal provides said voltage proportional to said output current and internal temperature of said converter.

22. The method according to claim 21 further comprising the step of coupling said error signal to a pulse width modulator, the output of said pulse width modulator controlling said switching transistor.

23. The method according to claim 22, wherein said converter is a buck-derived converter.

24. The method according to claim 22, wherein said converter is an isolated buck-boost derived converter.

25. A method for providing output current sensing in a switch mode power converter circuit having an input stage, including a voltage source and a switching transistor, and an output stage having an inductor for providing an output current to a load, said inductor having a first terminal and a second terminal, said inductor having an inherent resistance, said output current thereby providing a voltage between the first terminal and the second terminal of said inductor including a DC voltage component proportional to said inherent resistance and to said output current, said method comprising the steps of:

providing a filter circuit connected to said inductor for obtaining said DC voltage component of the voltage generated between the first terminal and the second terminal across the inherent resistance of said inductor, said filter circuit having a resistance coupled to a capacitance, said resistance and said capacitance forming a common terminal, wherein said common terminal exhibits said DC voltage component, said DC voltage component thereby proportional to internal temperature of said power converter, and wherein other terminal of said resistance coupled to a capacitance is connected to said inductor to sense said voltage generated between said first terminal and said second terminal across the internal resistance;

adjusting said DC voltage component proportional to said output current, according to a reference voltage by controlling the switching of said switching transistor.

26. The method according to claim 25, wherein said step of providing said filter circuit further comprising the step of providing said voltage proportional to said output current to a filter amplifier, and said step of adjusting further comprises the step of providing an error amplifier such that said error amplifier is responsive to said filter amplifier and said reference voltage.

27. The method according to claim 26 further comprising the steps of providing plurality of said switch mode power converters in parallel to share said load each power converter providing a current to said load, and said reference voltage being proportional to the average value of currents at the output of said plurality of switch mode power converters.

28. The invention according to claim 27 wherein said step of adjusting further comprises the step of providing said reference voltage for each power converter by coupling two resistors in series to the output of said filter amplifier, wherein all the common terminals of said two resistors at each switch mode power converter are connected together.

29. The method according to claim 28 further comprising the step of coupling said filter amplifier to two resistors connected in series, wherein the common terminal of said two resistors in series is coupled to the input of said error amplifier.

* * * * *